Jan. 6, 1925.
A. B. ROHR
1,521,906
APPARATUS FOR SPLICING CABLES
Filed Aug. 15, 1921  3 Sheets-Sheet 1
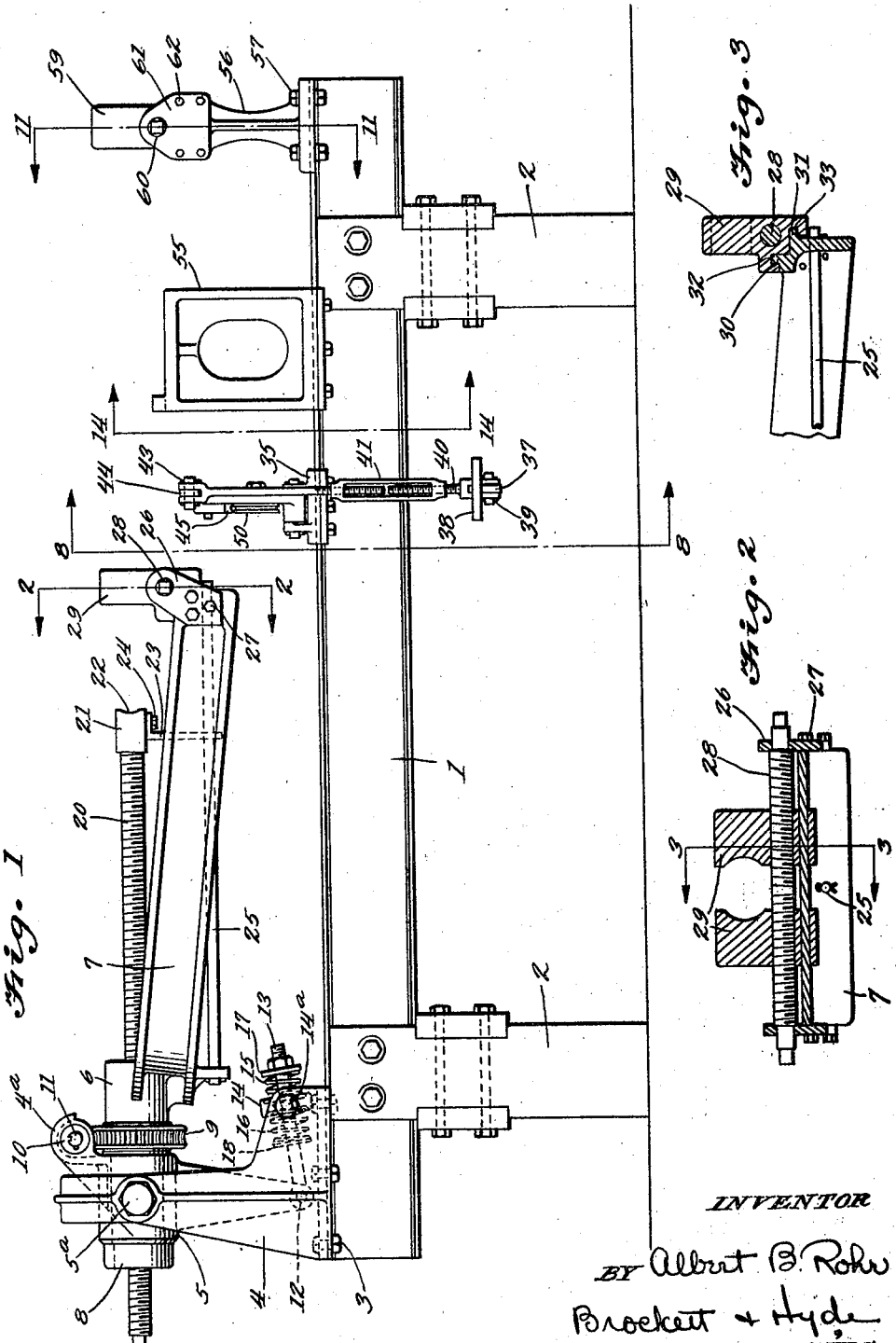
INVENTOR
BY Albert B. Rohr
Brockett & Hyde
ATTYS Jan. 6, 1925.

A. B. ROHR 1,521,906

APPARATUS FOR SPLICING CABLES

Filed Aug. 15, 1921      3 Sheets-Sheet 2

INVENTOR
Albert B. Rohr
BY Brockett + Hyde
ATTYS

Jan. 6, 1925.  1,521,906
A. B. ROHR
APPARATUS FOR SPLICING CABLES
Filed Aug. 15, 1921. 3 Sheets-Sheet 3
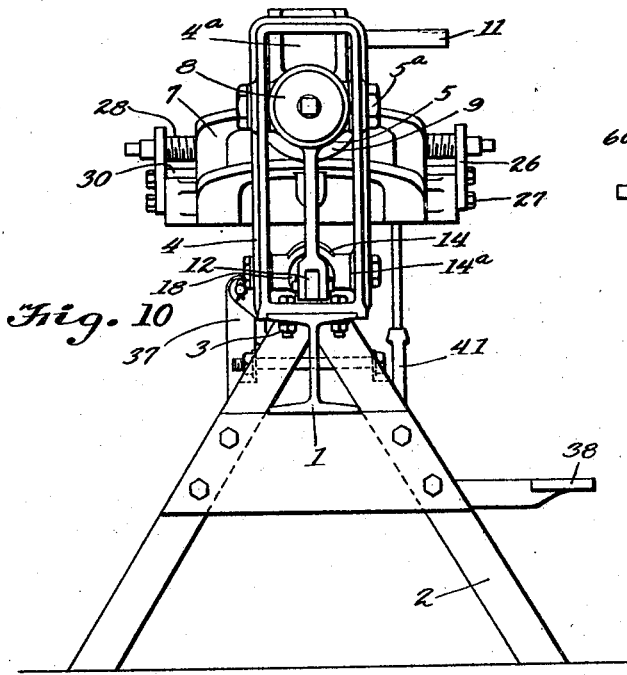
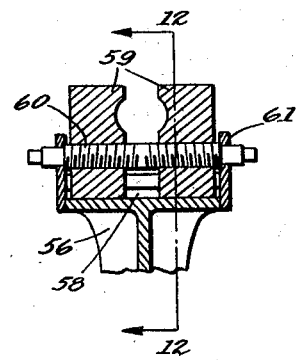
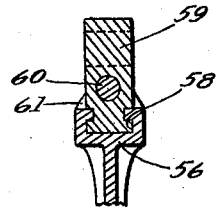
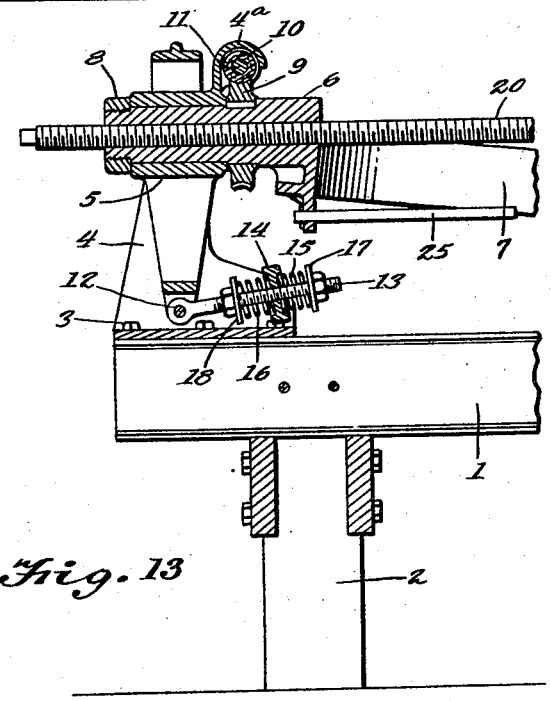
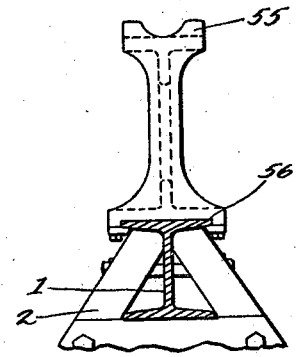
INVENTOR
Albert B. Rohr
BY
Brockett & Hyde
ATTYS Patented Jan. 6, 1925.

1,521,906

UNITED STATES PATENT OFFICE.

ALBERT B. ROHR, OF CLEVELAND, OHIO, ASSIGNOR TO THE UPSON-WALTON COMPANY, OF CLEVELAND, OHIO, A CORPORATION OF OHIO.

APPARATUS FOR SPLICING CABLES.

Application filed August 15, 1921. Serial No. 492,569.

*To all whom it may concern:*

Be it known that I, ALBERT B. ROHR, a citizen of the United States, residing at Cleveland, in the county of Cuyahoga and State of Ohio, have invented certain new and useful Improvements in Apparatus for Splicing Cables, of which the following is a specification.

This invention relates to improvements in apparatus for splicing cables and the like.

It is the object of this invention to provide an apparatus for conveniently and efficiently splicing a wire cable or the like. Furthermore it is the object of this invention to provide an improved means for untwisting the strands of a cable and extending the ends of the strands therebetween so as to form a loop, and more particularly to provide a rotatable frame carrying clamping means for holding the cable in looped form about an eye member, together with means for rotating this frame while holding the cable stationary at another point so as to untwist the strands of the cable to receive the ends of the strands therebetween; also to provide improved means for gripping and pulling the ends of the strands through the spaces therebetween; to provide also a movably mounted anvil upon which the several interengaged strands can be worked together into a splice; and to provide a means for permitting yield or depression of the rotatable frame while hammering the cable on the anvil.

Other objects of this invention will appear from the following description and claims when considered together with the accompanying drawings.

Figure 4:
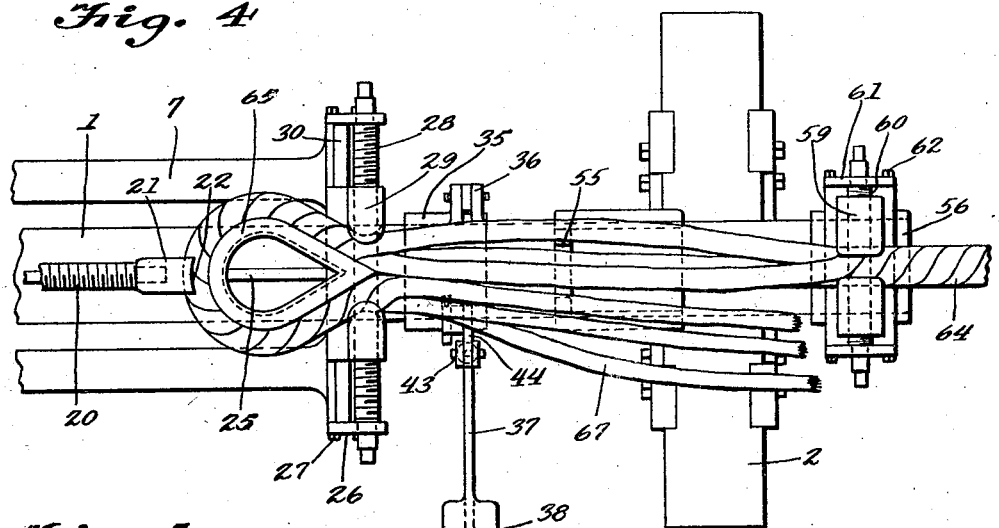
Figure 5:
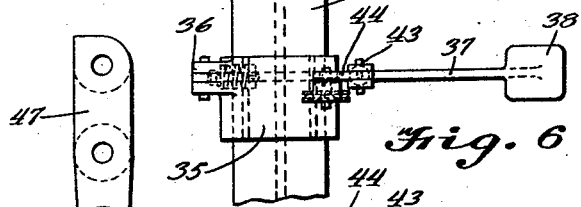
Figure 6:
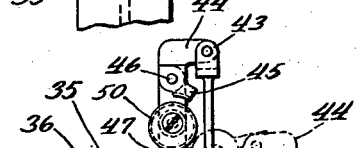
Figure 7:
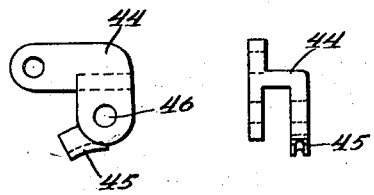
Figure 8:
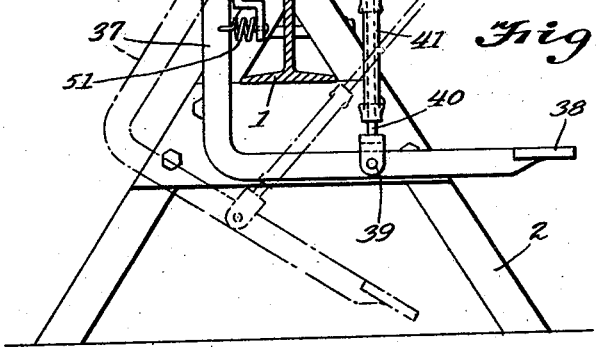
Figure 9:

Fig. 1 is a front elevation of my device; Fig. 2 is a section on line 2—2, Fig. 1; Fig. 3 is a section on line 3—3, Fig. 2; Fig. 4 is a plan view of a portion of my device; Fig. 5 is a detail view of the link 47 which forms a part of the gripping device; Fig. 6 is a plan view of the gripping device; Fig. 7 is a detail of the gripping dog or shoe; Fig. 8 is taken on line 8—8, Fig. 1; Fig. 9 is a detail of the eccentric for co-operation with the gripping dog; Fig. 10 is an end elevation of my device; Fig. 11 is a section on line 11—11, Fig. 1; Fig. 12 is a section on line 12—12, Fig. 11; Fig. 13 shows a vertical longitudinal section of the trunnion support for the one end of the yoke member; and Fig. 14 is a section on line 14—14, Fig. 1.

The I-beam 1 which is supported upon the legs 2 constitutes the main support for the several parts of my apparatus. Referring briefly to Fig. 1, there are supported at the left end of the I-beam a rotatable frame upon which is mounted the means for clamping the looped end of the cable, then to the right of this frame member is found the means for gripping the free ends of the strands for pulling the same through the spaces between the untwisted strands; then toward the right there is shown the anvil upon which the interlaced strands of the two cable portions are worked together and finally the stationary means for clamping the cable at another point. Briefly stated, my invention comprises means for clamping the end portion of a wire cable or the like in looped form and at the same time clamping the cable at another point to the right as viewed in Fig. 1. The frame member which carries the first clamping means is then rotated in the direction for untwisting the strands of the cable between the two points of clamping, the second means for clamping the cable remaining fixed. The free ends of the strands are then forced between the untwisted strands and by gripping the same with the gripping device provided, are pulled through. The splice is then in condition for the anvil which is moved up into proper position under the interlaced strands. The rotatable frame can then be rotated in the reverse direction so as to twist the strands of the main portion of the cable and in this way further secure the interlocked strands of the splice.

Suitably supported upon the left hand end of the I-beam 1, as viewed in Fig. 1, as by means of the bolts 3 is the trunnion holder 4 for the trunnion 5 which is pivotally mounted therein at the point 5ª by means of suitable trunnion pins. The bearing portion 6 of the inclined U-shaped rotatable yoke or frame 7 extends through the trunnion and has screw threaded thereon the nut 8. Feathered to the bearing 6 is the worm gear 9 which meshes with the worm 10 under housing 4ª and having the operating shaft 11. The lower end of the trunnion 5 has pivotal connection at 12 with the rod 13 which extends through a spring holder 14. This spring holder is pivotally mounted for rocking movement in the walls of the trunnion holder as indicated at 14ª and affords abutment for the adjacent ends of the springs 15 and 16 which are provided with the abutments 17 and 18 at their other ends. Threaded through the bearing 6 is the horizontal screw 20 upon the right hand end of which is swiveled the vise screw end member 21 which has a concave face 22 for engagement against the looped end portion of the cable. The angular bracket member 23, which is secured to the under face of the member 21 by means of bolts 24, has extending therethrough the rod 25 which is secured at its two ends in the yoke or frame member 7. This arrangement prevents relative turning between member 21 and frame 7 and at the same time affords means for guiding the screw 20 as it is adjusted lengthwise of the same through the bearing 6. The end plates 26 are secured by means of bolts 27 to the opposite sides of the frame or yoke member 7 and afford suitable support for the two ends of the screw 28 which engages the gripping blocks 29. The right hand end of the yoke or frame member 7 is provided with the upstanding flange 30 and the outwardly or horizontally extending flange 31 for sliding engagement with the correspondingly formed grooves 32 and 33, respectively, on the two adjustable blocks 29. This affords a means of guiding the blocks as they are adjusted back and forth.

The means for gripping the free ends of the strands at the end of the cable is mounted for slidable adjustment along the I-beam which is indicated more clearly in Fig. 8 of the drawings, the base portion of the gripping means which slides upon the I-beam being indicated at 35. Pivotally mounted upon the lug 36, which extends from the base portion 35, is the operating lever 37 terminating in the treadle 38 which is conveniently located for the operator. Pivotally connected at 39 is the lever arm 40 which has turn buckle connection 41 with the complementary lever arm 40 which in turn is pivoted at 43 to the dog member 44 provided with the gripping shoe 45. The dog member 44 has pivotal connection at 46 with the link 47 which in turn is pivoted at 48 to an upstanding bracket or lug on the base portion 35. Pivoted at a point substantially midway of the length of the link 47 is the eccentric 50 which is adapted for coöperation with the shoe 45 in gripping the end of a strand therebetween. A spring 51, which is connected at one end to the lever 37 and at the other end to a depending portion of the base 35, normally tends to raise the treadle 38 to the full line position shown in Fig. 8.

The anvil 55, which may be of any suitable form, is slidably mounted, as shown at 55ª, upon the top of the I-beam and, upon moving the gripping device just now described, out of the way, it is possible to slide the anvil to a position directly under the interlaced strands which are to form the splice. These strands can then be hammered so as to form a more secure joint. It should be here noted that the means for gripping the ends of the strands as well as the anvile are moved along the I-beam to the left as viewed in Fig. 1 when the yoke 7 has been swung to the upper position for untwisting the strands of the cable. The support 56, which is suitably secured, as by means of bolts 57, to the I-beam, remains in fixed position during the operation of my device. This support is provided with the groove 58 at its top portion for slidable engagement with the correspondingly formed clamping blocks 59 which grip the cable. The blocks 59 are moved back and forth by means of the screw 60 mounted in the side plates 61 which are bolted to the support 56 as indicated at 62.

Thus it will be seen that the wire cable illustrated at 64 can be clamped between the blocks 59 while the end portion is extended between and clamped by the clamping blocks 29. The end of the cable can then be passed about an eye member as illustrated at 65 and extended back between the blocks 29, the retaining member 21 being moved by means of the screw 20 to proper position for engagement with that portion of the cable which extends about the eye member. The frame member 7 is then rotated about an axle corresponding substantially with the longitudinal axis of the screw 20 or in other words, corresponding substantially with the center line of the main portion of the cable 64. This rotatable adjustment is effected by operation of the worm 10 which causes rotation of the gear 9 and consequently rotation of the bearing 6 which carries the frame 7. By rotating the frame or yoke member 7 in the proper direction the strands composing that portion of the cable which extends between the blocks 29 and 59 can be untwisted so as to provide spaces therebetween for the reception of the free ends of the strands at the extreme end of the cable as indicated at 67. These free ends of the strands are then extended through the spaces between the untwisted strands and are gripped by means of the gripping device by extending the ends of the strands between the gripping dog 45 and the eccentric 50. Then upon pressure of the treadle 38, the ends of the strands will be firmly gripped by rotation of the cam member 50 about its axis and the strand will be pulled through the untwisted portion of the cable upon further depression of the treadle 38 to dotted line position as shown in Fig. 8. The same operation is performed for each strand end until the several ends of the strands have been pulled through the untwisted portion of the cable.

Then, with the yoke member 7 turned to its upper position, out of the path of the gripping device and the anvil, the gripping device is moved to the left as viewed in Fig. 1 and the anvil is brought to a position directly under the interwoven or interlaced strands of the two portions of the cable so that they can be hammered into a more secure joint. Any force of the hammering of the splice on the anvil that might be transmitted to the yoke 7 will be taken up by the shock absorbing means at the lower end of the trunnion. Then upon returning the anvil and the gripping device to the position indicated in Fig. 1, the yoke or frame member 7 can be rotated in the reverse direction to the position indicated and in this way the interwoven strands of the two portions of the cable can be more firmly twisted into a joint or splice.

What I claim is:

1. Apparatus for splicing cables, comprising means for clamping two separated portions of a cable to be spliced, and means for rotating one of said clamping means to thereby open up the strands between the said separated portions to receive between them free strand ends during the splicing operation.

2. Apparatus for splicing cables, comprising means for clamping an end portion of a cable in loop form, and means for twisting the cable adjacent the loop to open up the cable strands to receive free strand ends during the splicing operation.

3. Apparatus for splicing cables, comprising means for clamping the end portion of a cable to be spliced in eye form, means for clamping the cable at another point, and means for rotating the eye clamping means to open up the cable strands to receive free strand ends for a splicing operation.

4. Apparatus for splicing cables, comprising a support, means rotatably mounted on said support for clamping the end portion of a cable in looped form, means on said support for clamping the cable at another point, said first named means being rotatable about the axis of the cable to open up the strands thereof and also having yielding motion about an axis transverse to the cable axis.

5. Apparatus for splicing cables, comprising a support, means rotatably mounted on said support for clamping the end portion of a cable in looped form, means on said support for clamping the cable at another point, said first named means being rotatable about the axis of the cable to open up the strands thereof to receive the free ends of the strands, and an anvil movably mounted upon said support to be brought into operative position under those parts of the cable that have been interwoven.

6. Apparatus for splicing cables, comprising a support, means rotatably mounted on said support for clamping the end portion of a cable in looped form, means on said support for clamping the cable at another point, said first named means being rotatable about the axis of the cable to open up the strands thereof to receive the free ends of the strands, means movably mounted upon said support for forcing the free ends of the strands through the spaces between the strands, and an anvil movably mounted upon said support to be brought into operative position under those parts of the cable that have been interwoven.

7. Apparatus for splicing cables, comprising a rotatably mounted yoke member, means thereon for clamping a cable in looped form about an eye, adjustable means for co-operation with said clamping means for maintaining the cable looped about the eye, means for holding the cable fixed at another point, and means for rotating said yoke member about the axis of the cable to open up the strands thereof.

8. Apparatus for splicing cables, comprising a support, means mounted thereon for clamping the end portion of a cable in looped form, means for clamping the cable at another point, means for rotating the first named clamping means to open up the strands of the cable and a yieldable connection between said first named clamping means and said support.

9. Apparatus for splicing cables, comprising a support, means rotatably mounted thereon for clamping the end portion of a cable about an eye, screw means extending substantially co-axially with the cable for co-operating in maintaining the cable in position about the eye, means for holding the cable at another point, and means for rotating said first named means substantially about the axis of said screw means.

In testimony whereof I hereby affix my signature.

ALBERT B. ROHR.